United States Patent [19]

Mogaki

[11] Patent Number: 5,107,246
[45] Date of Patent: Apr. 21, 1992

[54] APPARATUS AND METHOD FOR DETERMINING A FAILURE OF A TEMPERATURE SENSOR FOR AN AUTOMATIC TRANSMISSION

[75] Inventor: Shinichi Mogaki, Himeji, Japan

[73] Assignee: Mitsubishi Denki Kabushiki Kaisha, Tokyo, Japan

[21] Appl. No.: 654,985

[22] Filed: Feb. 14, 1991

[30] Foreign Application Priority Data

Feb. 20, 1990 [JP] Japan .................................. 2-40247

[51] Int. Cl.⁵ .................... B60Q 11/00; G01M 19/00
[52] U.S. Cl. ................................. 340/449; 340/587; 73/118.1; 364/424.03
[58] Field of Search ............... 340/438, 449, 459, 587; 374/145, 166; 73/118.1; 364/424.03

[56] References Cited

U.S. PATENT DOCUMENTS

| | | | |
|---|---|---|---|
| 3,723,964 | 3/1973 | Lace | 340/459 |
| 3,916,178 | 10/1975 | Greenwald | 364/332.9 |
| 3,949,356 | 4/1976 | Fuzzell et al. | 340/459 |
| 4,034,369 | 7/1977 | Tanigawa et al. | 340/459 |
| 4,092,642 | 5/1978 | Green et al. | 340/459 |
| 4,214,227 | 7/1980 | Papasideris | 340/459 |
| 4,488,140 | 12/1984 | Lang et al. | 340/449 |
| 4,497,057 | 1/1985 | Kato et al. | 340/461 |
| 4,817,418 | 4/1989 | Asami et al. | 73/118.1 |
| 4,901,061 | 2/1990 | Twerdochlib | 340/587 |
| 4,949,078 | 8/1990 | Ito et al. | 340/449 |

FOREIGN PATENT DOCUMENTS

| | | | |
|---|---|---|---|
| 62944 | 4/1982 | Japan . | |
| 0822111 | 4/1981 | U.S.S.R. | 364/424.03 |
| 1171824 | 8/1985 | U.S.S.R. | 340/587 |
| 1558471 | 1/1980 | United Kingdom | 340/587 |
| 2224373 | 5/1990 | United Kingdom | 364/424.03 |

*Primary Examiner*—Allan N. Shoap
*Assistant Examiner*—Diego F. F. Gutierrez
*Attorney, Agent, or Firm*—Sughrue, Mion, Zinn, Macpeak and Seas

[57] ABSTRACT

An apparatus and a method for determining a failure of a temperature sensor for an automatic transmission of a motor vehicle are provided. A first temperature sensor senses the temperature of a coolant for cooling an engine. A second temperature sensor senses the temperature of a hydraulic oil in the transmission. The output of the second temperature sensor is compared with a first failure determination level and a second failure determination level. It is determined that the second temperature sensor is in a failure when the output of the second temperature sensor is lower than the first failure determination level or higher than the second failure determination level. The output of the first temperature sensor is compared with a first predetermined level and a second predetermined level which is higher than the first predetermined level. The determination of a failure of the second temperature sensor is prohibited when the output of the first temperature sensor is below the first predetermined level or above the second predetermined level.

2 Claims, 4 Drawing Sheets

APPARATUS AND METHOD FOR DETERMINING A FAILURE OF A TEMPERATURE SENSOR FOR AN AUTOMATIC TRANSMISSION

BACKGROUND OF THE INVENTION

The present invention relates to an apparatus and a method for determining a failure of a temperature sensor for an automatic transmission.

FIG. 3 shows a known apparatus for determining a failure of a temperature sensor for an automatic transmission of a motor vehicle. The apparatus includes an engine 1, an automatic transmission 2, a first temperature sensor 3 in the form of a coolant temperature sensor for sensing the temperature of a coolant for cooling the engine 1, an air flow sensor 4 for sensing the amount of intake air sucked into the engine 1, a rpm sensor 5 for sensing the number of revolutions per minute of the engine 1, a throttle sensor 6 for sensing the degree of opening of a throttle valve (not shown), an injector 7 for injecting a metered amount of fuel to the engine 1, an electronic control unit (ECU) 8 for controlling the injector 7, a second temperature sensor 9 in the form of an oil temperature sensor for sensing the temperature of hydraulic oil in the transmission 2, a speed sensor 10 for sensing the speed of a vehicle based on the rotational speed of a rotation shaft (not shown) in the transmission 2, a solenoid 11 for performing gear change or lockup of the transmission 2, and an electronic automatic transmission control unit (EAT) 12 for controlling the solenoid 11. The electronic control unit 8 and the electronic automatic transmission control unit 12 are connected with each other through a signal line or they are accommodated in a single unit. The electronic control unit 8 controls the injector 7 based on the outputs of the first temperature sensor 3, the air flow sensor 4 and the rpm sensor 5. The electronic automatic transmission control unit 12 controls the speed-change and lockup solenoid 11 based on the outputs of the throttle sensor 6, the second temperature sensor 9 and the speed sensor 10 so as to perform speed-change control.

FIG. 4 illustrates an interface circuit of the electronic automatic transmission control unit 12 for the second temperature sensor 9. The output of the second temperature sensor 9 is divided by resistors R1, R2 which are series connected with each other between a power supply of 5 volts and ground, then subjected to analog to digital conversion by an A/D converter 13, and fed to a central control unit (CPU) 14.

With the above-described apparatus, a failure of the second temperature sensor 9 is determined by detecting whether or not the output of the second temperature sensor 9, which is converted from analog to digital form by the A/D converter 13, is outside a predetermined range. Specifically, there exists a certain relationship between the temperature of hydraulic oil in the transmission 2 and the A/D converted output of the second temperature sensor 9, as shown in FIG. 5. When the second temperature sensor 9 is open, the output of the A/D converter 13 is nearly of 5 volts, whereas it is approximately zero when the second temperature sensor 9 is short-circuited. Accordingly, the CPU 14 performs failure determination using a first failure determination level which is slightly higher than the output of the A/D converter 13 when the sensor 9 is short-circuited, and a second failure determination level which is slightly lower than the A/D converter output when the sensor 9 is open. As can be seen from FIG. 5, however, the A/D converted output of the second temperature sensor 9 becomes close to the first and second failure determination levels at high and low temperatures of the hydraulic oil. As a result, it could be possible to determine, due to variations in the operational characteristic of the sensor 9 itself or variations in the operating characteristic of the interface circuit of the electronic automatic transmission control unit 12, a failure of the sensor 9 in spite of the fact that it is normal.

SUMMARY OF THE INVENTION

The present invention is intended to obviate the above problems of the known failure determination apparatus.

An object of the present invention is to provide a novel and improved apparatus and a method for determining a failure of a temperature sensor for an automotive transmission which is able to perform failure determination on an oil temperature sensor in a most accurate manner.

In order to achieve the above object, according to one aspect of the present invention, there is provided an apparatus for determining a failure of a temperature sensor for an automatic transmission, the apparatus comprising:

a first temperature sensor for sensing the temperature of a coolant which cools an engine;

a second temperature sensor for sensing the temperature of a hydraulic oil in the transmission;

failure determining means for determining a failure of the second temperature sensor when the output of the second temperature sensor is lower than a first failure determination level or higher than a second failure determination level; and failure determination prohibiting means for prohibiting the failure determination of the failure determining means when the output of the first temperature sensor is below a first predetermined level or above a second predetermined level which is higher than the first predetermined level.

According to another aspect of the present invention, there is provided a method for determining a failure of a temperature sensor for an automatic transmission, the method comprising the steps of:

sensing the temperature of a coolant for cooling an engine;

sensing the temperature of hydraulic oil in the transmission;

comparing the output of the second temperature sensor with a first failure determination level and a second failure determination level;

determining a failure of the second temperature sensor when the output of the second temperature sensor is lower than the first failure determination level or higher than the second failure determination level; and comparing the output of the first temperature sensor with a first predetermined level and a second predetermined level which is higher than the first predetermined level; and prohibiting the determination of a failure of the second temperature sensor when the output of the first temperature sensor is below the first predetermined level or above the second predetermined level.

The above and other objects, features and advantages of the present invention will become apparent from the following detailed description of a preferred embodiment of the invention taken in conjunction with the accompanying drawings.

DESCRIPTION OF THE PREFERRED EMBODIMENT

Figure 1:
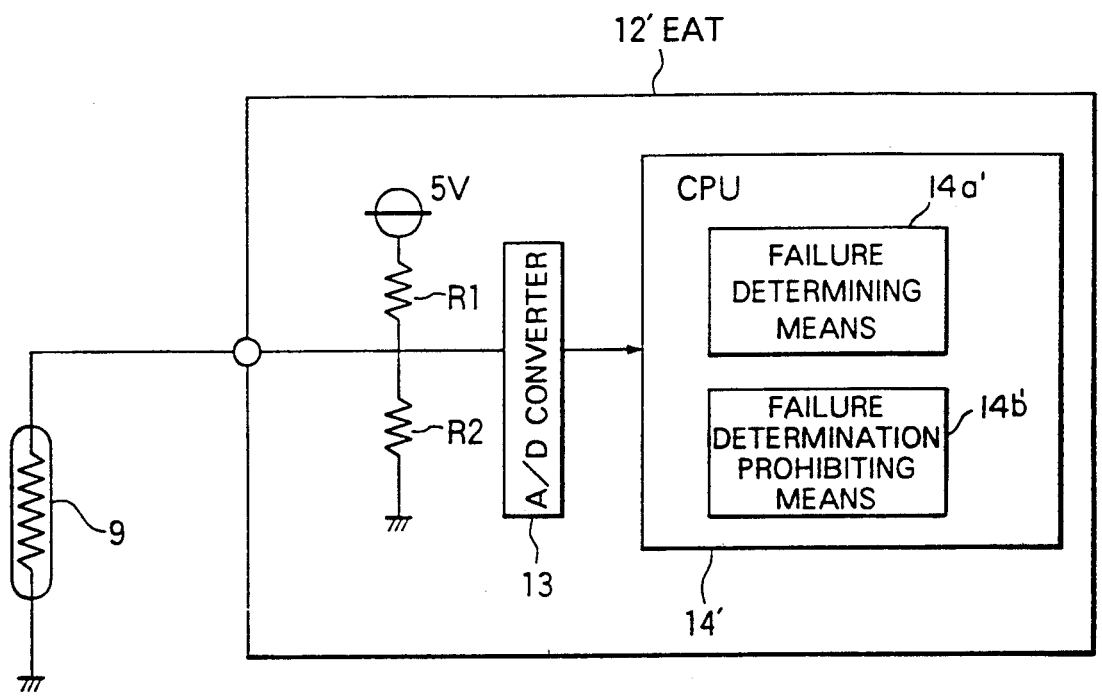
FIG. 1 is a circuit diagram of an apparatus for determining a failure of a temperature sensor for an automatic transmission in accordance with the present invention.
Figure 2:
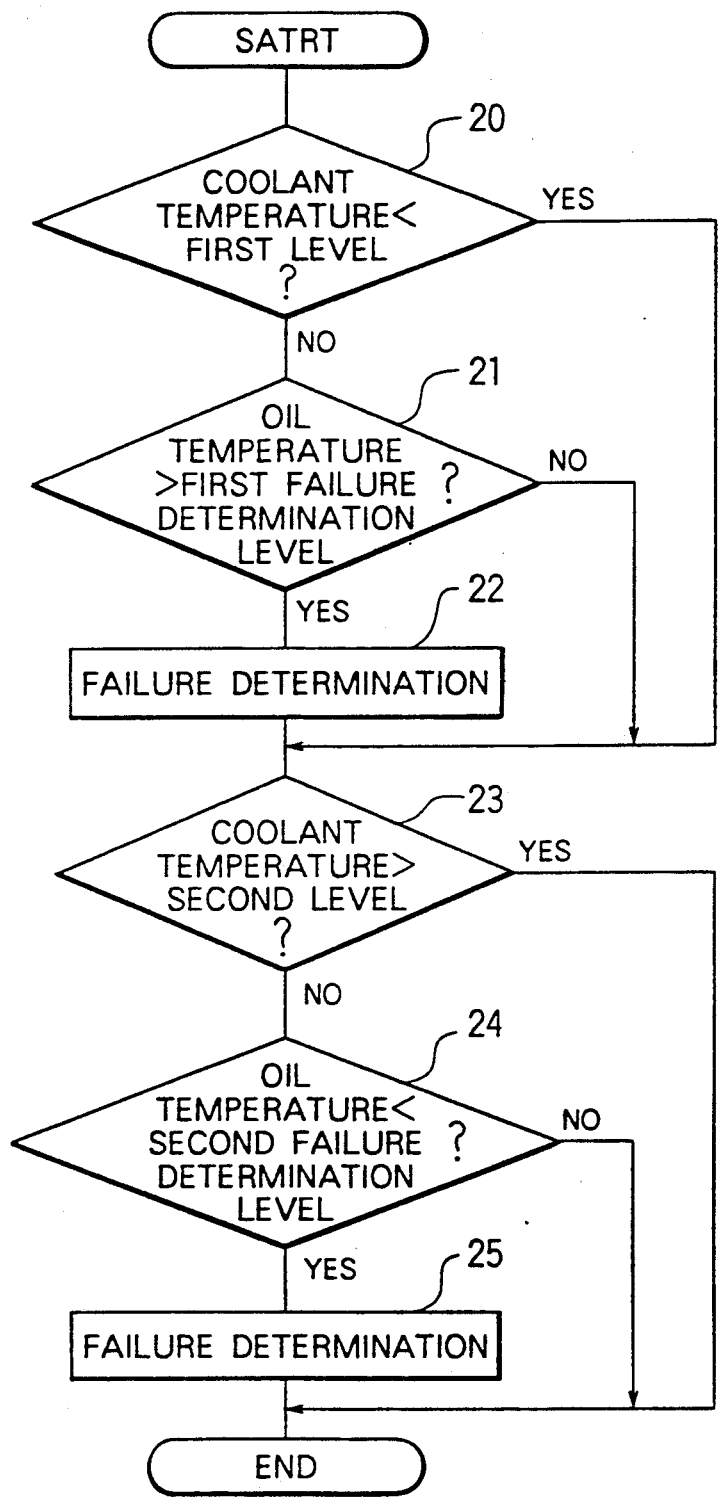
FIG. 2 is a flow chart showing the operational process of the apparatus of FIG. 1.
Figure 3:
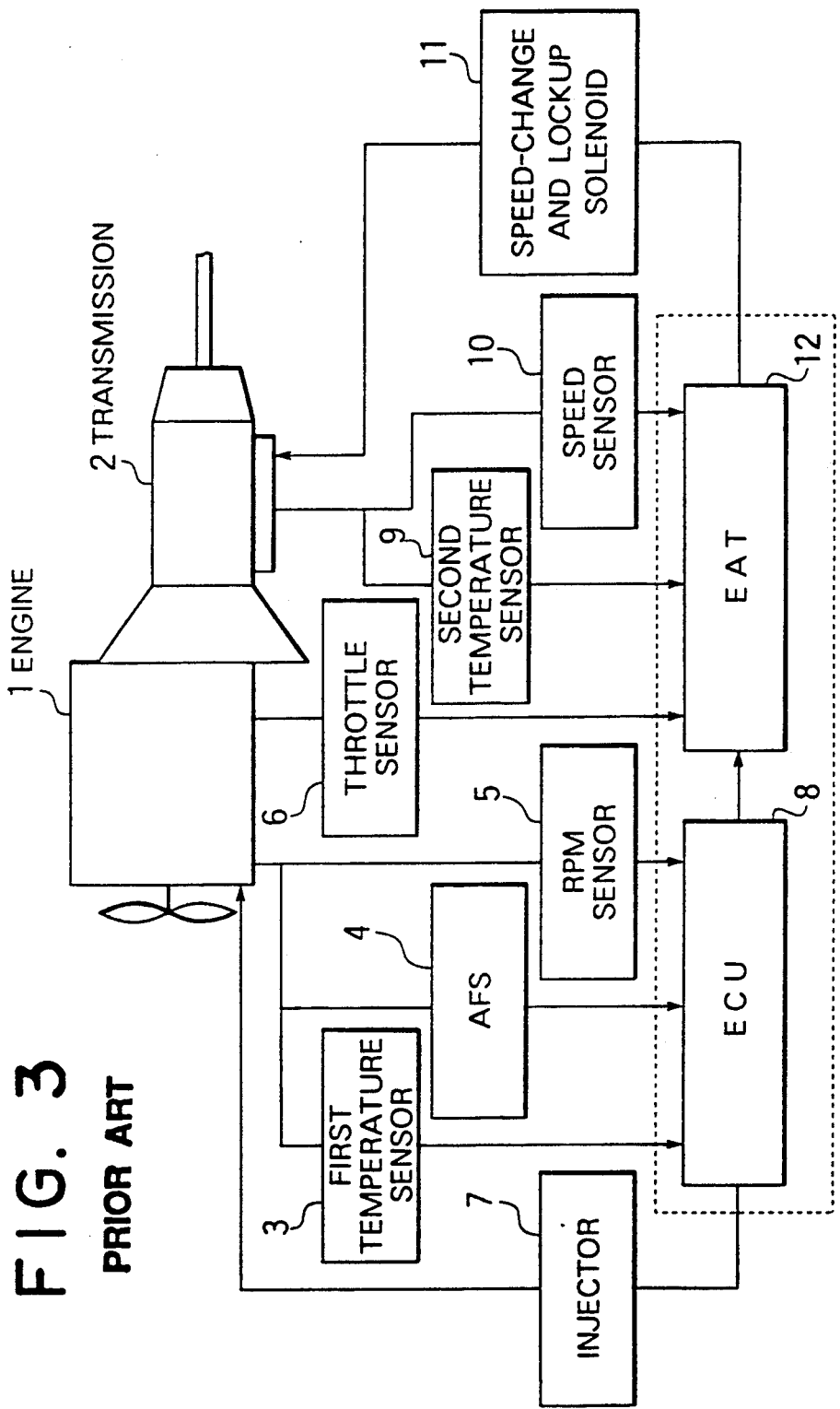
FIG. 3 is a block diagram showing the general arrangement of a known apparatus for determining a failure of a temperature sensor for an automatic transmission.
Figure 5:
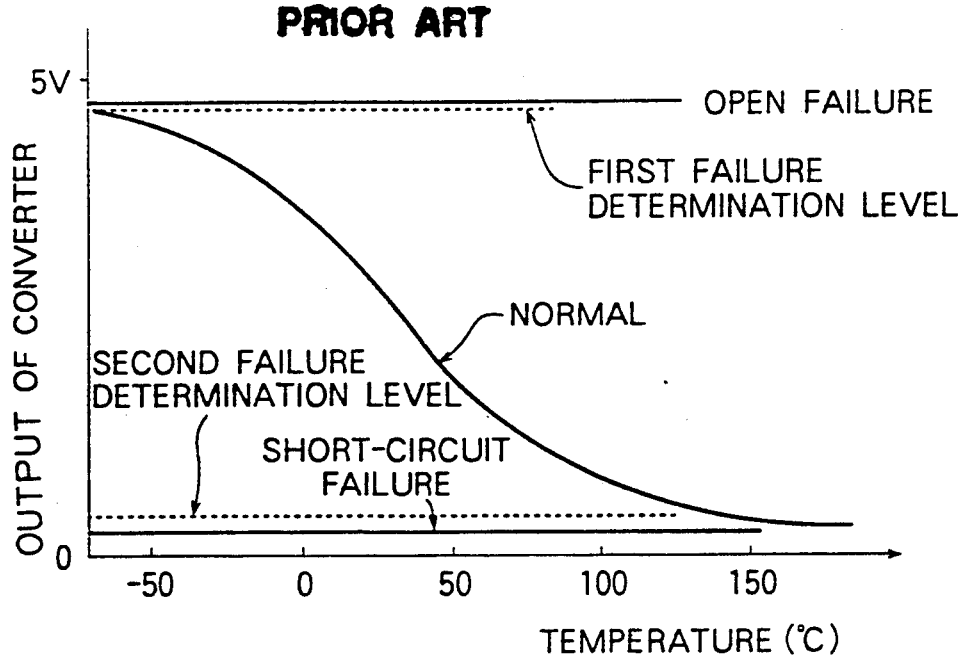
FIG. 5 is a graphic representation showing the output characteristic of a second or oil temperature sensor of FIG. 3.

An embodiment of the present invention will now be described in detail with particular reference to FIGS. 1 and 2, while referring also to FIGS. 3 and 5 for assisting the description of the present invention.

Figure 4:
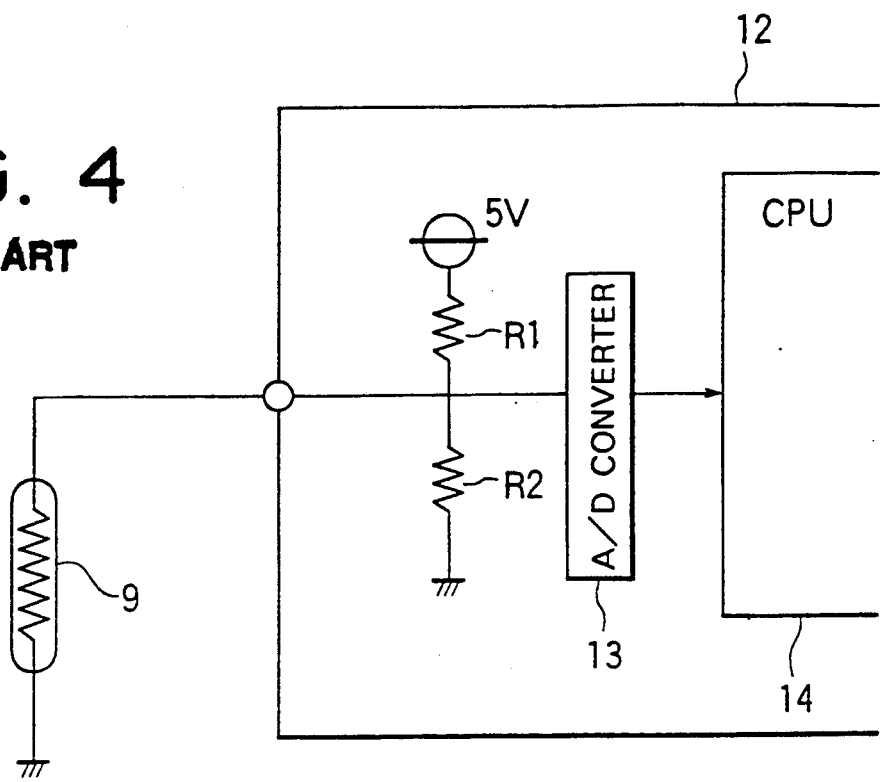
FIG. 4 is a circuit diagram of an interface circuit of an automatic transmission control unit of FIG. 3.

An apparatus for determining a failure of a temperature sensor for an automatic transmission according to the present invention is substantially similar in construction to the known apparatus as described before with reference to FIGS. 3 through 5 except for an electronic automatic transmission control unit 12'. An embodiment of such an electronic automatic transmission control unit 12' of the invention is illustrated in FIG. 1, and comprises, in addition to the same component elements R1, R2 and 13, a central processing unit 14' which is different from the CPU 14 of FIG. 4. Specifically, the CPU 14' of the invention includes a failure determining means 14a' for determining a failure of the second or oil temperature sensor 9 when the output of the second temperature sensor 9 is lower than a first failure determination level or higher than a second failure determination level, and a failure determination prohibiting means 14b' for prohibiting the failure determination of the failure determining means 14a' when the output of the first or coolant temperature sensor 3 (see FIG. 3) is below a first predetermined level or above a second predetermined level which is higher than the first predetermined level.

Now, the operation of the above embodiment will be described in detail with particular reference to the flow chart of FIG. 2.

First in Step 20, it is determined whether the output of the first temperature sensor 3 representative of the temperature of the coolant for cooling the engine 1 is lower than a prescribed level. If the answer is "YES", the temperature of the hydraulic oil in the transmission 2, which has a close relation with the coolant temperature, is considered to be low so that there is the possibility of mistakenly determining that the second or oil temperature sensor 9 is in an open failure. Therefore, in this case, the determination of an open-failure of the sensor 9 is prohibited and the process goes to Step 23. On the other hand, If the answer is "NO" in Step 20 (i.e., the coolant temperature is equal or higher than the prescirbed level), the process goes to Sep 21 wherein it is further determined whether the A/D converted output of the sensor 9 is higher than the second open-failure determination level (see FIG. 5). If the answer is "YES", then in Step 22, it is determined that the sensor 9 is in an open failure, and the process goes to Step 23. If, however, the answer is "NO" in Step 21 (i.e., the A/D converted output of the sensor 9 is lower than or equal to the second open-failure determination level), the process directly goes to Step 23. In Step 23, it is determined whether the coolant temperature is higher than a second predetermined level which is higher than the first predetermined level. If the answer is "YES", the temperature of the hydraulic oil is also considered to be high so that there exists the possibility of mistakenly determining that the sensor 9 is in a failure of short-circuiting. Accordingly, the determination of a short-circuit failure is prohibited. On the other hand, if the answer is "NO" in Step 23 (i.e., the coolant temperature is lower than or equal to the second predetermined level), the process goes to Step 24 wherein it is further determined whether the A/D converted output of the second temperature sensor 9 is lower than the second short-circuit determination level. If the answer is "YES", then in Step 25, it is determined that the sensor 9 is in a short-circuit failure.

Even if an open or short-circuit failure actually takes place when the failure determination is prohibited, there will be no problem since in this case, the difference between the actual value of the second sensor output and the first or second failure determination level is negligibly small.

As described in the foregoing, according to the present invention, when the temperature of the engine coolant is lower than the first predetermined level or higher than the second predetermined level, the determination of a failure of the second oil temperature sensor 9 is prohibited. In these low and high ranges of the coolant temperature, the temperature of the hydraulic oil in the transmission 2 is near the coolant temperature so that there exists the possibility of mistakenly determining an open failure or a short-circuit failure of the oil temperature sensor 9. However, such a possibility is substantially eliminated by prohibiting failure determination in these temperature ranges, so that it is always possible to detect a failure of the oil temperature sensor 9 in a highly accurate way.

What is claimed is:

1. An apparatus for determining a failure of a temperature sensor for an automatic transmission, the apparatus comprising:
   a first temperature sensor for sensing the temperature of a coolant which cools an engine;
   a second temperature sensor for sensing the temperature of a hydraulic oil in the transmission;
   failure determining means for determining a failure of the second temperature sensor when a temperature indicative output signal of the second temperature sensor is lower than a first failure determination level or higher than a second failure determination level; and
   failure determination prohibiting means for prohibiting a failure determination of the failure determining means when a temperature indicative output signal of the first temperature sensor is below a first predetermined level or above a second predetermined level which is higher than the first predetermined level.

2. A method for determining a failure of a temperature sensor for an automatic transmission, the method comprising the steps of:

sensing the temperature of a coolant for cooling an engine using a first temperature sensor;

sensing the temperature of a hydraulic oil in the transmission using a second temperature sensor;

comparing a temperature indicative output signal of the second temperature sensor with a first failure determination level and a second failure determination level;

determining a failure of the second temperature sensor when said output signal of the second temperature sensor is lower than the first failure determination level or higher than the second failure determination level; and comparing a temperature indicative output signal of the first temperature sensor with a first predetermined level and a second predetermined level which is higher than the first predetermined level; and prohibiting the determination of a failure of the second temperature sensor when said output signal of the first temperature sensor is below the first predetermined level or above the second predetermined level.

* * * * *